(12) United States Patent
Amer

(10) Patent No.: US 11,576,188 B2
(45) Date of Patent: Feb. 7, 2023

(54) EXTERNAL INTERFERENCE RADAR

(71) Applicant: T-Mobile USA, Inc., Bellevue, WA (US)

(72) Inventor: Mohamed Amer, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 124 days.

(21) Appl. No.: 17/125,060

(22) Filed: Dec. 17, 2020

(65) Prior Publication Data

US 2022/0201694 A1    Jun. 23, 2022

(51) Int. Cl.
| H04W 72/08 | (2009.01) |
| H04B 17/318 | (2015.01) |
| H04W 72/0453 | (2023.01) |
| H04W 72/0446 | (2023.01) |
| H04W 72/06 | (2009.01) |

(52) U.S. Cl.
CPC ........ *H04W 72/082* (2013.01); *H04B 17/318* (2015.01); *H04W 72/0446* (2013.01); *H04W 72/0453* (2013.01); *H04W 72/06* (2013.01)

(58) Field of Classification Search
CPC ........... H04W 72/082; H04W 72/0446; H04W 72/0453; H04W 72/06; H04B 17/318
See application file for complete search history.

(56) References Cited

U.S. PATENT DOCUMENTS

| 9,768,928 | B1 * | 9/2017 | Yue | H04W 4/025 |
| 10,511,414 | B2 * | 12/2019 | Liu | H04L 5/0055 |
| 10,708,103 | B2 * | 7/2020 | Frank | H04L 5/0053 |
| 10,917,153 | B2 * | 2/2021 | Park | H04B 7/0695 |
| 11,317,304 | B2 * | 4/2022 | Kapala | H04B 17/3913 |
| 11,323,927 | B2 * | 5/2022 | Diggins | H04W 36/0061 |
| 2008/0013473 | A1 * | 1/2008 | Proctor, Jr. | H04B 7/15507 455/14 |
| 2017/0353929 | A1 * | 12/2017 | Tacconi | H04W 52/243 |
| 2018/0013522 | A1 * | 1/2018 | Liu | H04L 1/1854 |
| 2018/0295617 | A1 * | 10/2018 | Abdelmonem | H04W 28/0236 |
| 2019/0052294 | A1 * | 2/2019 | Abdelmonem | H04B 17/336 |
| 2019/0052381 | A1 * | 2/2019 | Abdelmonem | H04B 17/18 |
| 2019/0074999 | A1 * | 3/2019 | Fechtel | H04L 25/0206 |
| 2019/0132759 | A1 * | 5/2019 | Park | H04L 5/0051 |
| 2019/0173553 | A1 * | 6/2019 | Park | H04L 27/2607 |
| 2019/0229967 | A1 * | 7/2019 | Frank | H04W 52/362 |
| 2019/0253115 | A1 * | 8/2019 | Park | H04B 7/0626 |

(Continued)

FOREIGN PATENT DOCUMENTS

WO    WO-2019160741 A1 *    8/2019    ........... H04L 5/0048

*Primary Examiner* — Jay P Patel
(74) *Attorney, Agent, or Firm* — Loeb & Loeb LLP

(57) ABSTRACT

Aspects of the invention provide an external interference radar that remedies such shortcomings by providing a hybrid approach that provides an initial spectrum analysis to identify known interferences. The signal is also divided into physical resource blocks (PRB) to better identify interferences that occur intermittently. Once these intermittent interferences are illustrated, a signal pattern detection algorithm is applied to the identified signals and may further accurately identify the intermittent interferences. As part of the identification, the radar further provides a report that identifies whether the interference is a permanent or intermittent; a type of the interference and the severity of the interference.

20 Claims, 11 Drawing Sheets

(56) References Cited

U.S. PATENT DOCUMENTS

| | | | |
|---|---|---|---|
| 2019/0261289 A1* | 8/2019 | Raghavan | H04W 52/367 |
| 2020/0213890 A1* | 7/2020 | Park | H04W 24/10 |
| 2020/0267584 A1* | 8/2020 | Kim | H04L 1/0027 |
| 2020/0336193 A1* | 10/2020 | Park | H04B 7/0695 |
| 2020/0400776 A1* | 12/2020 | Sotoyama | G07B 15/063 |
| 2021/0099210 A1* | 4/2021 | Ramireddy | H04B 7/0434 |
| 2021/0126689 A1* | 4/2021 | Park | H04B 7/0617 |
| 2021/0127284 A1* | 4/2021 | Abdelmonem | H04W 24/08 |
| 2021/0143885 A1* | 5/2021 | Großmann | H04B 7/0626 |
| 2021/0160746 A1* | 5/2021 | Diggins | H04W 36/0083 |
| 2021/0226674 A1* | 7/2021 | Ramireddy | H04B 7/0417 |
| 2022/0053491 A1* | 2/2022 | Sevindik | H04L 27/0002 |
| 2022/0095135 A1* | 3/2022 | Kapala | H04W 24/02 |

\* cited by examiner

EXTERNAL INTERFERENCE RADAR

TECHNICAL FIELD

Aspects of the embodiments of the invention generally relate to analysis of mobile signals. In particular, embodiments of the invention generally relate to mobile signal interferences and detections thereof.

BACKGROUND

Interferences of wireless signals occur at various times of wireless network operations. When they happen, mobile network carriers take active steps to identify the sources of interferences and whether the interferences are caused by carriers' towers or equipment. Existing tools would perform a spectrum analysis of the signals across a given time frame and, based on the spectrum analysis, the existing tool can preliminarily identify well-identified or persistent interferences. However, this would fail to identify intermittent interferences that may be other environmental interferences. Similarly, existing tool may actually recognize actual interferences and would treat them as such. However, such actual interferences might be an actual interference due to faulty equipment or other items under the carriers' control.

Aspects of the invention attempt to address the shortcomings of the prior approaches.

SUMMARY

Aspects of the invention provide an external interference radar or a detection system that remedies prior technologies' shortcomings by providing a hybrid approach to identifier signal interferences. In one example, embodiments of the invention provide an initial spectrum analysis to identify known interferences. The signal, whether identifying existing or known interferences or not, is then divided into physical resource blocks (PRB) to better identify interferences that occur intermittently. Some embodiments may include that once these intermittent interferences are illustrated, a signal pattern detection algorithm is applied to the identified signals to further accurately identify the intermittent interferences. As part of the identification, aspects of the invention further provide a report that identifies one or more of the following: whether the interference is a permanent or intermittent; whether the interference can be categorized, and what is the severity of the interference.

BRIEF DESCRIPTION OF THE DRAWINGS

Persons of ordinary skill in the art may appreciate that elements in the figures are illustrated for simplicity and clarity so not all connections and options have been shown. For example, common but well-understood elements that are useful or necessary in a commercially feasible embodiment may often not be depicted in order to facilitate a less obstructed view of these various embodiments of the present disclosure. It may be further appreciated that certain actions and/or steps may be described or depicted in a particular order of occurrence while those skilled in the art may understand that such specificity with respect to sequence is not actually required. It may also be understood that the terms and expressions used herein may be defined with respect to their corresponding respective areas of inquiry and study except where specific meanings have otherwise been set forth herein.

DETAILED DESCRIPTION

Embodiments may now be described more fully with reference to the accompanying drawings, which form a part hereof, and which show, by way of illustration, specific exemplary embodiments which may be practiced. These illustrations and exemplary embodiments may be presented with the understanding that the present disclosure is an exemplification of the principles of one or more embodiments and may not be intended to limit any one of the embodiments illustrated. Embodiments may be embodied in many different forms and should not be construed as limited to the embodiments set forth herein; rather, these embodiments are provided so that this disclosure may be thorough and complete, and may fully convey the scope of embodiments to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

Aspects of the invention improve over prior methods in detecting mobile wireless band, spectrum, or signal interferences. In one example, many bands, frequencies or spectrums of wireless signals are used for mobile communications. In one instance, 2G frequency bands or frequencies include 850 and 1900 MHz are used in the United States of America. 3G signal bands include 850, 1700, 2100, or 1900. 4G LTE frequency spectrums (in MHz) include 600, 700, 850, 1700, 2100, 1900, 2300, 2500, 3500, or the like in the United States. Furthermore, 5G spectrums include 600, 850, 2500, 28000, or 3900 MHz. It is to be understood that other spectrums, frequencies, or bands may be used.

However, sometimes a regulatory agency may repurpose certain frequency for mobile wireless network use. For example, wireless microphone frequency of 600 MHz has now been repurposed to be used in the 5G spectrum.

With such repurposed use of frequencies, for example, it is important for aspects of the invention to identify the true or actual interferences or easily screen out initial detected interferences. Therefore, in one example, embodiments of the invention may first identify known frequencies or a band of frequencies that may be identified as interferences to a given mobile wireless carrier's network spectrum.

Figure 1:
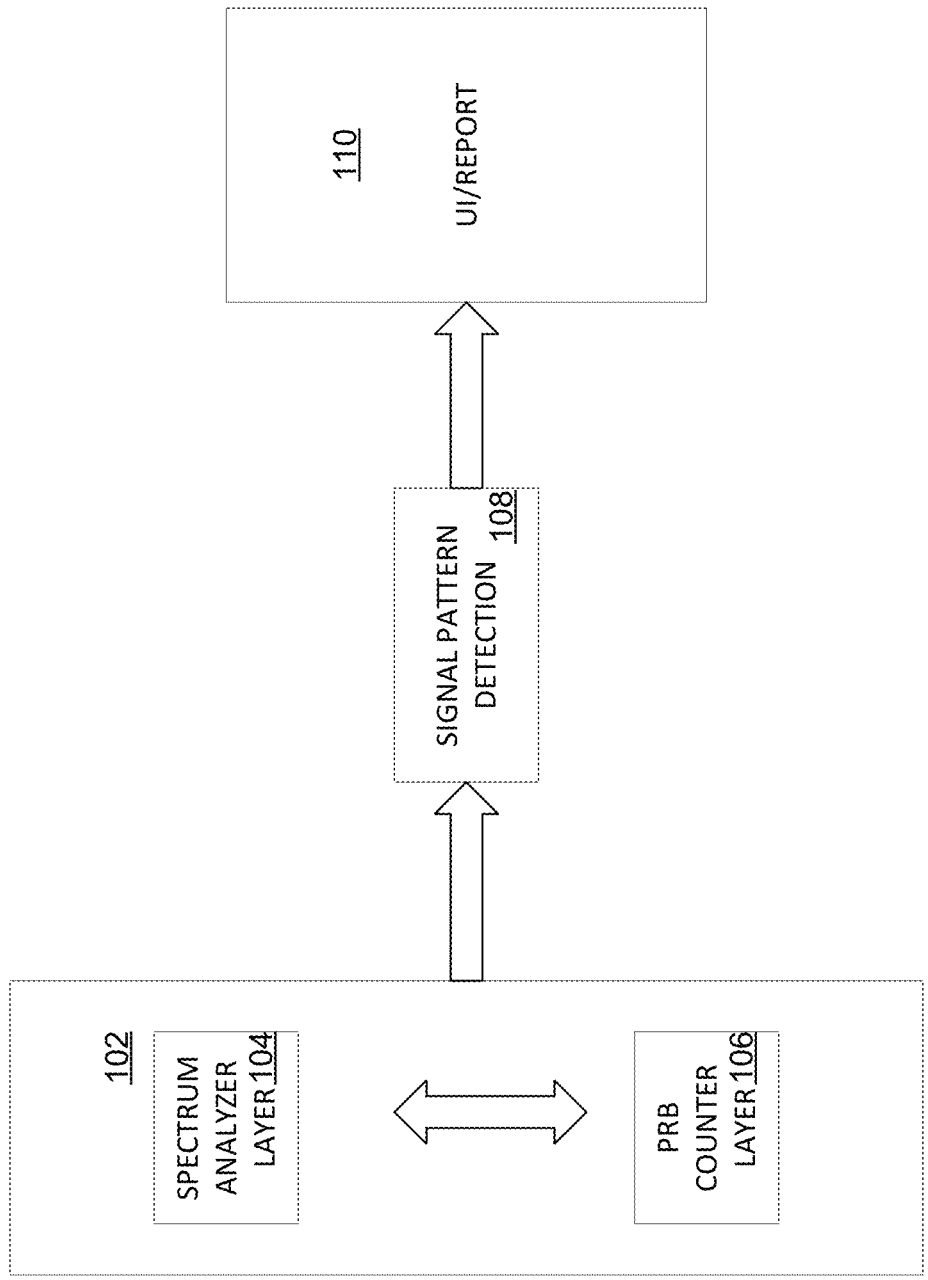
FIG. 1 illustrates a system for detecting signal interferences according to some embodiments.
Figure 11:
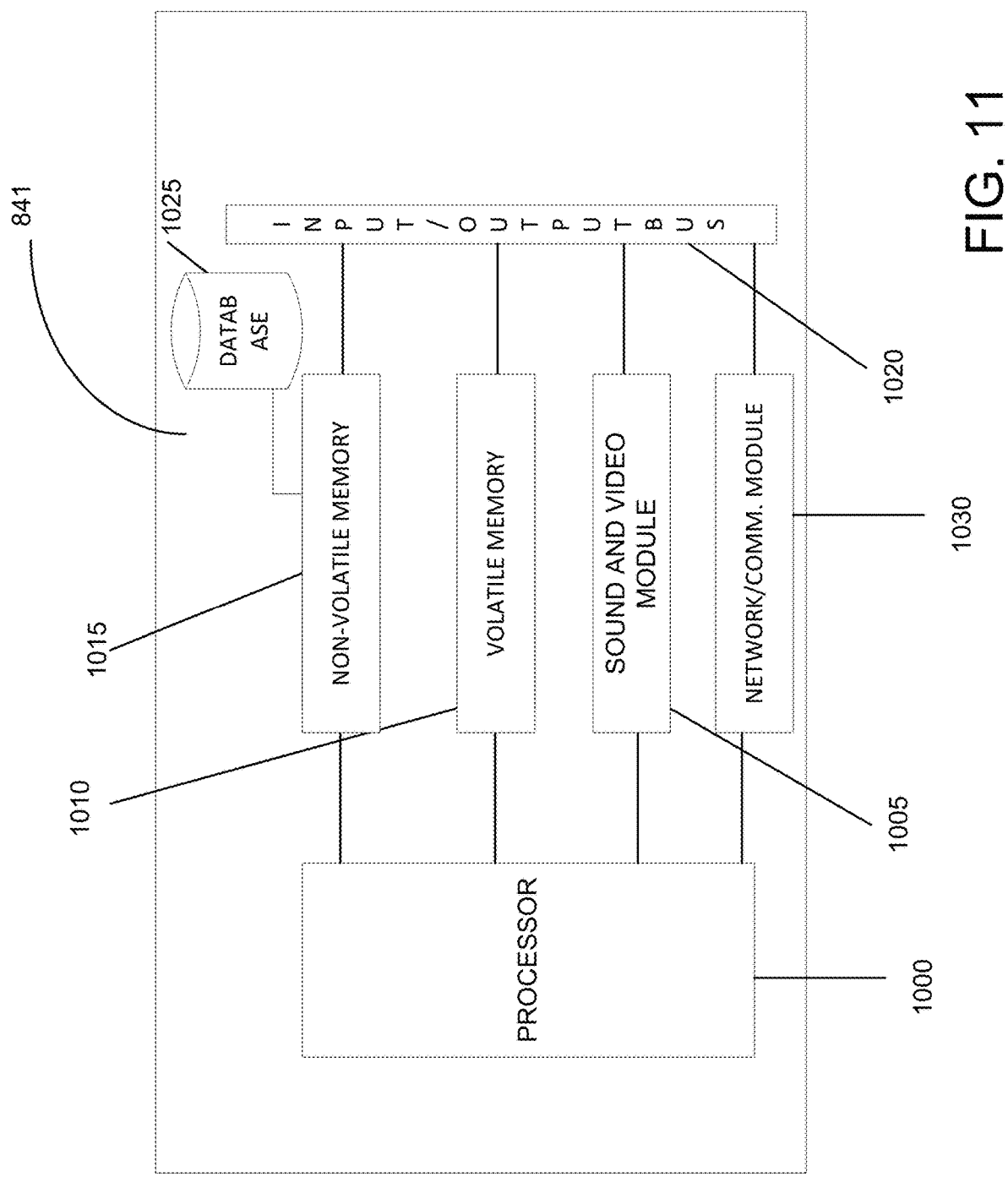
FIG. 11 is a diagram illustrating a computing device according to one embodiment.

Referring now to FIG. 1, a diagram illustrates a system 100 for detecting mobile signal interferences according to some embodiments. In one example, a detection system 102 may receive signal inputs detected by sensors at wireless towers or mobile devices. For example, the detection system 102 may be a computing device, such as the device 841 as shown in FIG. 11. In another embodiment, the detection system 102 may further be connected or coupled to a cloud server (not shown) as the cloud server may have applications or programs to process signals received or detected by sensors.

Figure 2:
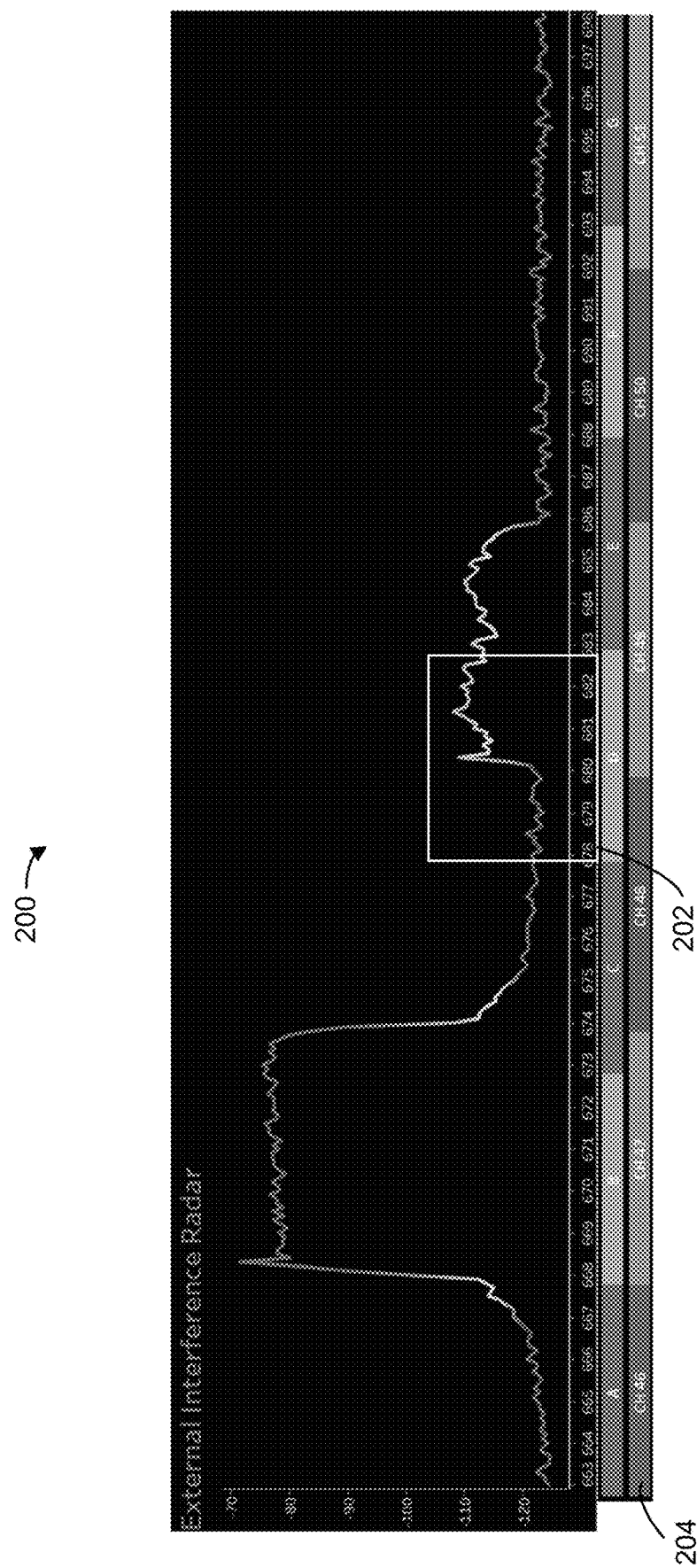
FIG. 2 illustrates an exemplary graph of a spectrum analyzer as detected at a given tower according to some embodiments.

In one example, the detection system 102 may include a spectrum analyzer layer 104. In one example, the layer 104 may be an application layer where one or more application programs, executed by one or more processors (e.g., device 841 or the cloud server), to analyze the spectrums detected or sensed. In one aspect, FIG. 2 illustrates an exemplary graph 200 of the spectrum analyzer layer 104 as detected at a given tower according to some embodiments. For example, in the exemplary graph 200, a particular band 202 may identify a particular band (e.g., band D) by the spectrum analyzer layer 104 by the detection system 102. In another embodiment, a channel identifier 204 may also be provided in a user interface shown in FIG. 2 so that the spectrum analysis result may quickly be presented to a user or a reviewer.

In some embodiments, the detection system 102 may first employ a machine learning algorithm to perform a preprocessing of the spectrum analysis. For example, the preprocessing may include analyzing the detected, received, or sensed signal's spectrum or frequency by comparing that to identified frequencies. Machine learning may be used to analyze the signals and compare the received signals to known signals to preprocess the signals. For example, the preprocessing may flag or label known signals so that it may enable the user to identify the signals faster.

For example, as discussed above, the spectrum of 600 MHz was previously purposed for wireless microphones. Suppose there is an outdoor or indoor concert or a political event where multiple wireless microphones are used. If a subscriber is attempting to make a call at the concert hall in a close proximity to the concert hall, the subscriber's user equipment (UE) or mobile carrier's tower's sensors may detect or record the spectrum 600 MHz range. As such, the spectrum analyzer layer 104 may detect the 600 MHz as an interference, but a known interference.

In another embodiment, the preprocessing may further include inputs from additional sources. Using the example above, the preprocessing may receive information such as date and time of the concert, so that upon reviewing the detected signals at spectrum 600 MHz, the layer 104 may identify the spectrum to be a known interference.

However, aspects of the invention do not stop at the spectrum analysis. In one example, television (TV) signal bandwidth may be about 6 MHz. Due to the signal strength from TV signal towers, it is relative easy to identify or analyzed that signal if detected.

However, merely having the known spectrum as part of the spectrum analyzer layer 104 does not provide a clear identification of an interference. In fact, prior technologies would flag the TV signal spectrum as a known spectrum and therefore would not consider it as an interference based purely on a spectrum analysis. In other words, faulty equipment's may exhibit or display a known spectrum. However, aspects of the invention may not stop there; embodiments of the invention may perform additional analysis and review to enable the user or reviewer to perform one last analysis before confirming whether it is an interference.

As such, aspects of the invention improve over existing approaches by incorporating physical resource blocks (PRB) representations of the detected signal or spectrum to analyze the detected signals. In some embodiments, the PRBs may provide a technical solution to the existing problem of identifying potential interferences even they may be detected as a known spectrum. By recalibrating the output of sensors, the PRBs may combine like signals to allow easily analysis by an engineer or an algorithm.

Figure 3:
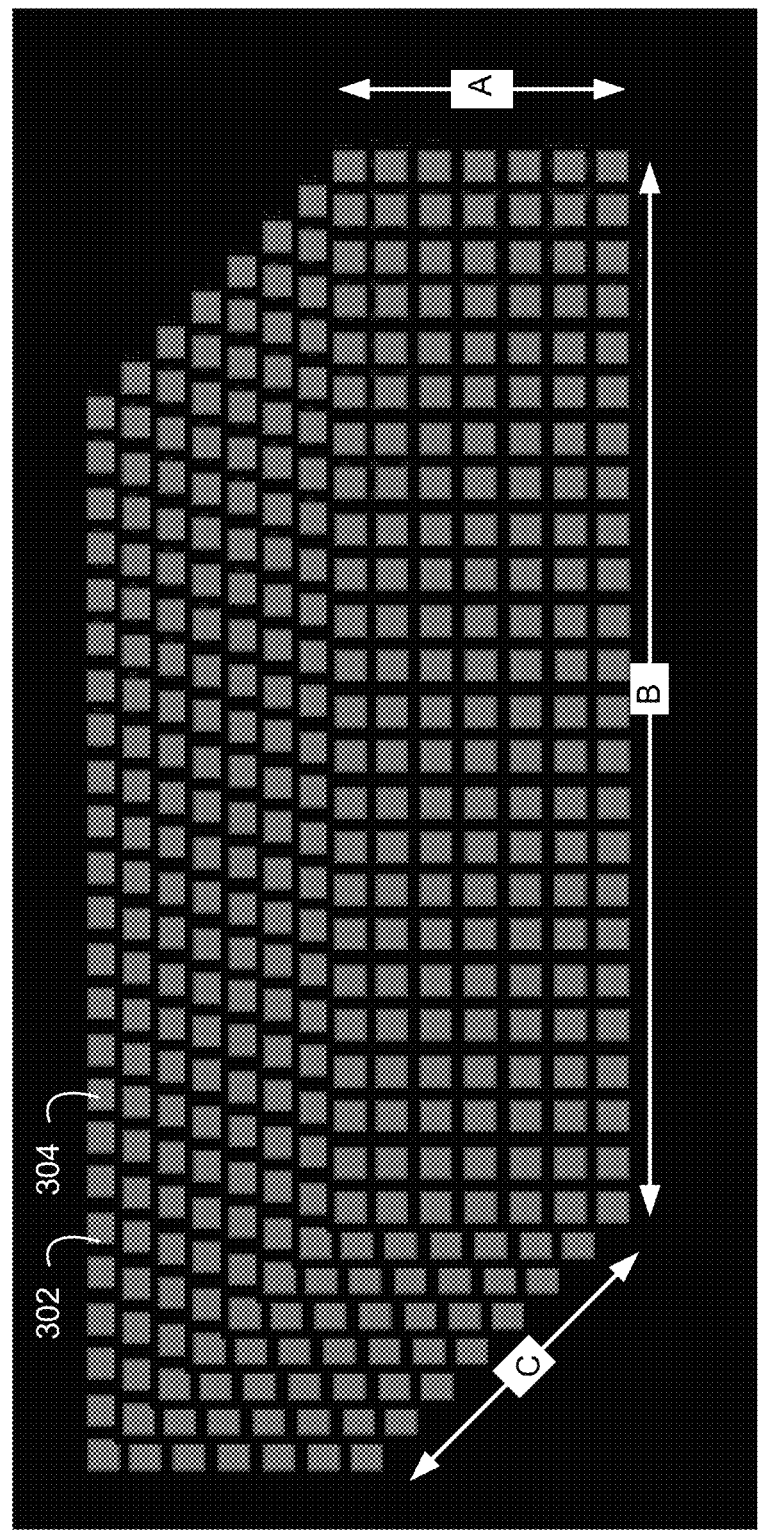
FIG. 3 illustrates a diagram showing physical resource blocks (PRBs) according to some embodiments.

In some embodiments, referring now to FIG. 3, a set of PRB is illustrated. In one embodiment, each of the PRB (e.g., cell 302 or 304) may represent a fraction for the bandwidth or frequency. For example, a signal in 10 MHz may be represented by 50 PRBs. As such, the PRB enables a user or a network administrator or algorithm that reviews the signal frequencies represented by the PRBs as a counter to know the strength of the signal. For example, the higher the number PRBs for a given signal is the higher the strength of the frequency.

Furthermore, the PRBs may be configured in a three dimensional visual representation or a time sliced matrix so that the Z-axis or C shows the number of PRB, the X-axis or B shows the number of hours and Y-axis or A shows the number of days. It is to be understood other representation of the PRB may be used. For example, as PRBs are used as a counter layer, other counter mechanisms may be used to measure or identify a pattern for the detected signals. In some embodiments, other mechanisms that indicate or record detection with a periodicity, a timing measure, or a timing parameter may be used.

In other words, the configuration of the PRB may enable periodic monitoring of the signals. In a further embodiment, the PRB may be viewed as block counters to identify the interferences.

Contrary to prior approaches, the spectrum analyzer layer was used. This usage, as indicated above, may only identify the strength of the signals in one dimension. In other words, there was no indication of timing—no indication of continuous snapshot in time. In other words, the fact there is an existence of a particular signal occurring at a certain time fails to clearly identify whether the particular signal is an interference. Aspects of the invention remedy this shortcomings by using the hybrid approaches and layers—a first spectrum analyzer layer and a second PRB counter layer.

Figure 4:
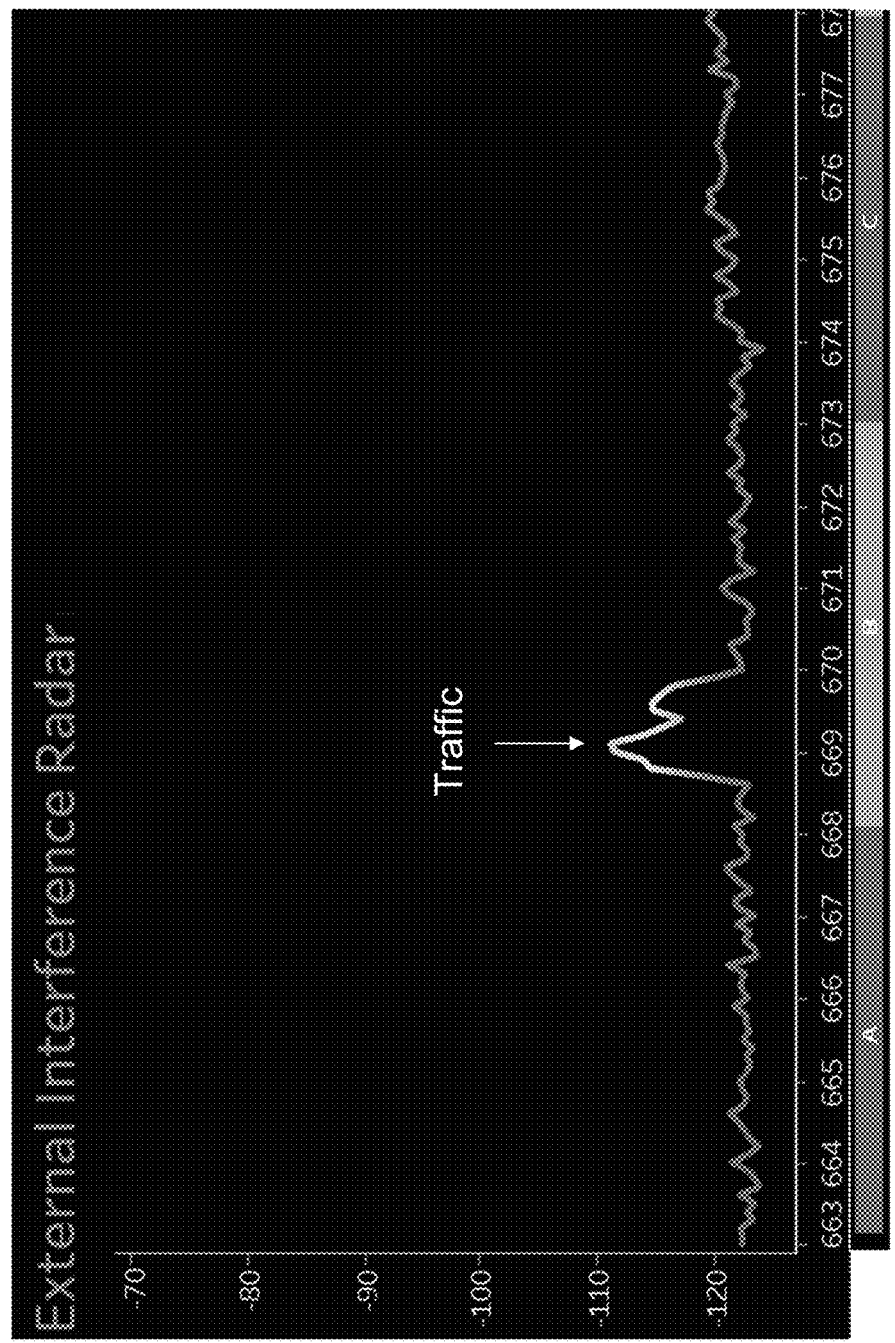
FIGS. 4-8 illustrate detected signal interferences according to some embodiments.
Figure 5:
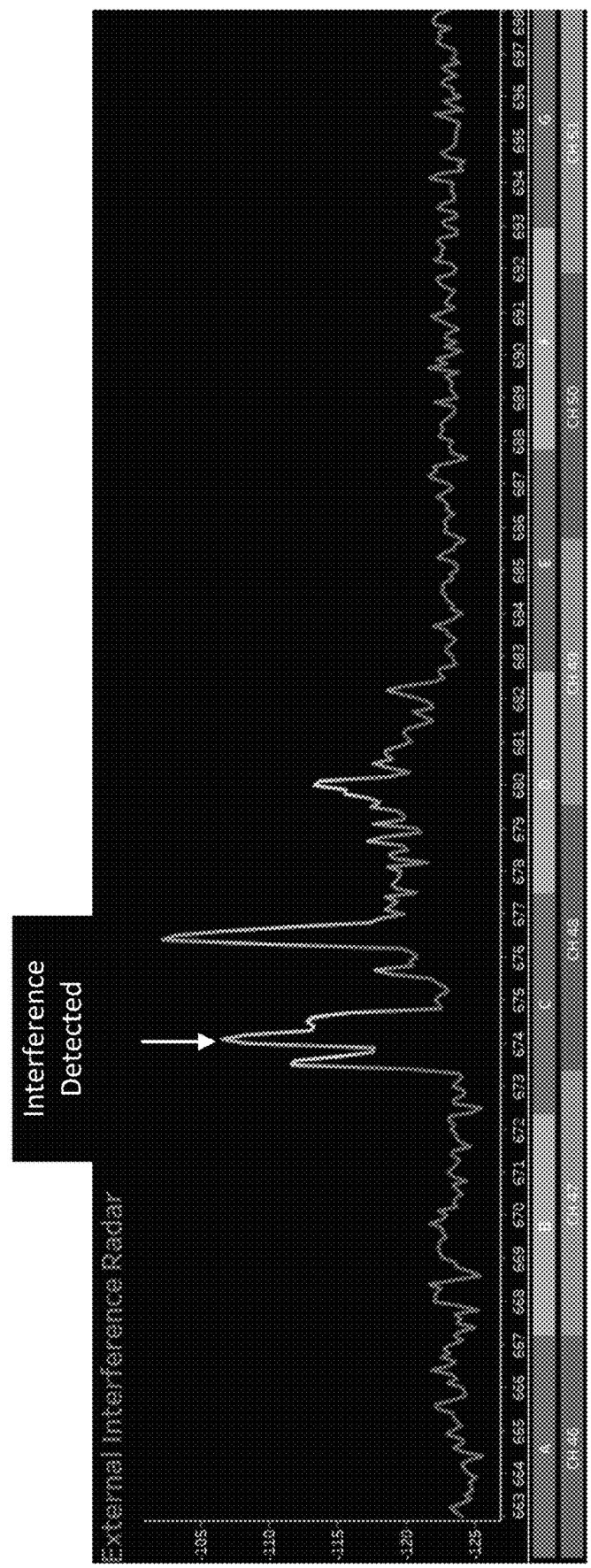
Figure 6:
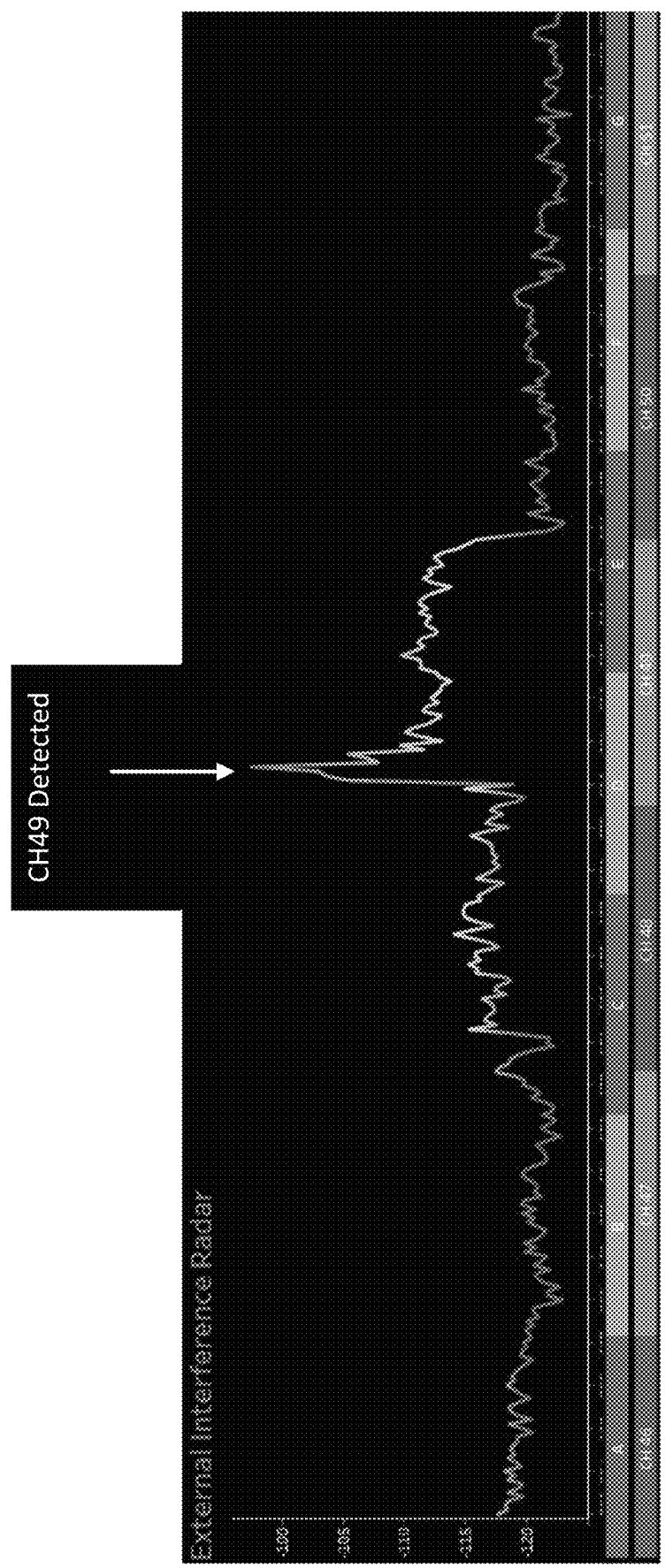
Figure 7:
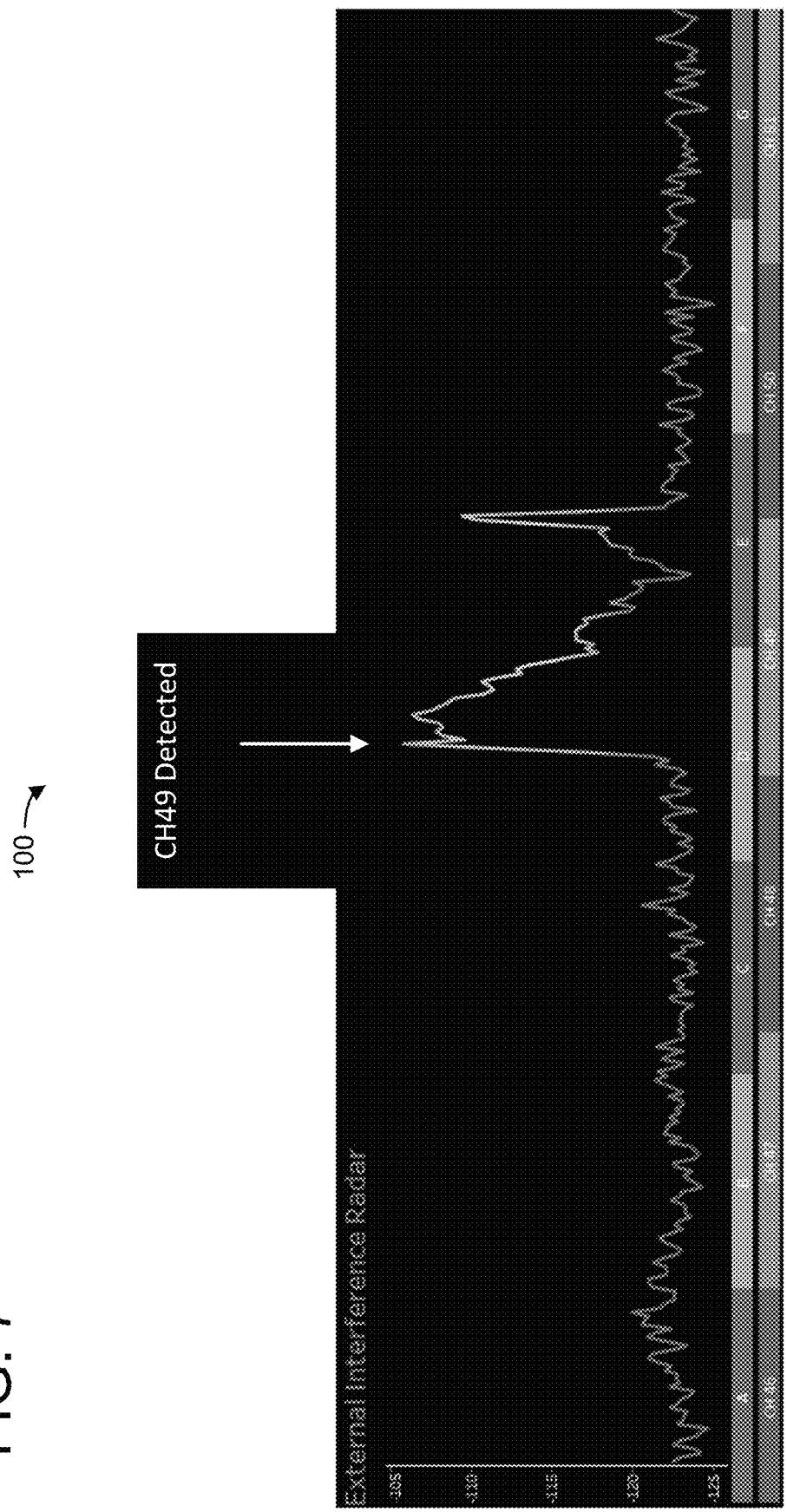
Figure 8:

In another embodiment, FIGS. 4 through 8 are illustrations of the detected signal according to one embodiment. In another example, the FIGS. 4 and 8 illustrate the detected signals at a given tower. It is to be understood that the user interfaces shown in FIGS. 4 to 8 may be displayed separately or individually. In another embodiment, the detected signals may be displayed collectively or in an aggregate so that an administrator may review multiple towers' signal status. For example, a notification may be configured by the administrator for each tower's signal interference threshold and may be notified if that threshold is exceeded. The administrator may then select that notification and the full view of the detected signal, as shown in FIGS. 2 and 4-8, may be seen.

In yet another embodiment, once the detection system 102 analyzes the detected or sensed signal, the system 100 may further process the analyzed information to a signal pattern detection 108. In one embodiment, the signal pattern detection 108 may be conducted based on software programs. For example, the system 100 may be the remote computing device 841 in FIG. 11 and that the detection system 102 may be coupled to the system 100 via a communications network (not shown). The system 100 may include one or more processors that execute computer-executable instructions that may be embodied in software programs. In another embodiment, the system 100 may run the signal pattern detection 108 in a distributed manner over a network connection.

In one embodiment, the system 100 may employ or execute computer-executable instructions that are directed to a digital signal processing (DSP) algorithm. In one embodiment, the DSP algorithm may include specific, step-by-step procedures for mathematical calculations designed to manipulate digital signals. In another embodiment, the DSP algorithm employed may be directed to the pattern of the signals received from the detection system 102. In other words, instead of focusing on the level of the different signal frequencies, aspects of the invention, through the DSP algorithm, attempt to identify a pattern of the signals, and through the pattern, whether any of the signals are indeed interferences. In one embodiment, the DSP algorithm may receive input, as part of the processing the information from the PRB counter layer, such as time of the day, the number of hour, the frequency, a location of the detected signal, or a duration of the detected signal. Other inputs or parameters may include correlation between the received levels of the neighboring PRBs.

In yet another example, suppose signals are detected by the detection system 102 to resemble that of a tropospheric Doppler radar frequency or spectrum. Instead of identifying that as an interference, aspects of the invention may receive input such as locations and that if the location information identifies a range (e.g., 100 miles) of how far away from a weather station, or whether the location may be near a coastal area. In yet another embodiment, a time of the day (e.g., morning, noon, evening, or night) may also be part of the input to identify the pattern. As such, with the combination of the above (e.g., Doppler spectrum, detected at a coastal area, and detected at night), instead of determining that the signal as an interference, aspects of the invention may determine, based on the pattern, that the detected signal may not be an interference associated with the network equipment or network itself. In another embodiment, the system 100 may further identify or label a specific type to the pattern.

In another embodiment, the system 100 may provide a report, or a specially designed user interface (UI), or a web portal 110 to be displayed or be provisioned to a user or a network administrator. For example, the UI may enable the user to edit or update the label provided by the system 100 with respect to the pattern analyzed. In yet another embodiment, the system may provide the data to another algorithm or computing system through an API or in a data structure or a flat file or in another appropriate format which may be appropriate, consistent and efficient.

In another embodiment, the UI may further provide additional reference data. For example, in the example of the Doppler radar above, the additional reference data may include a map to be displayed in the UI so that the user may reference the location of the signal on a map.

In yet another embodiment, the system 100 may create a profile to classify the patterns identified by the DSP algorithm. For example, the Doppler radar example may trigger the system 100 to suggest a "Doppler profile" to identify those signals based on the similarity to a profile. In addition, the profiles may be created by the system and the method. For example, Doppler radar may a distinct pattern. The algorithm may learn from past signal patterns to recognize that a new signal pattern is sufficiently similar to a Doppler radar pattern.

Figure 9:
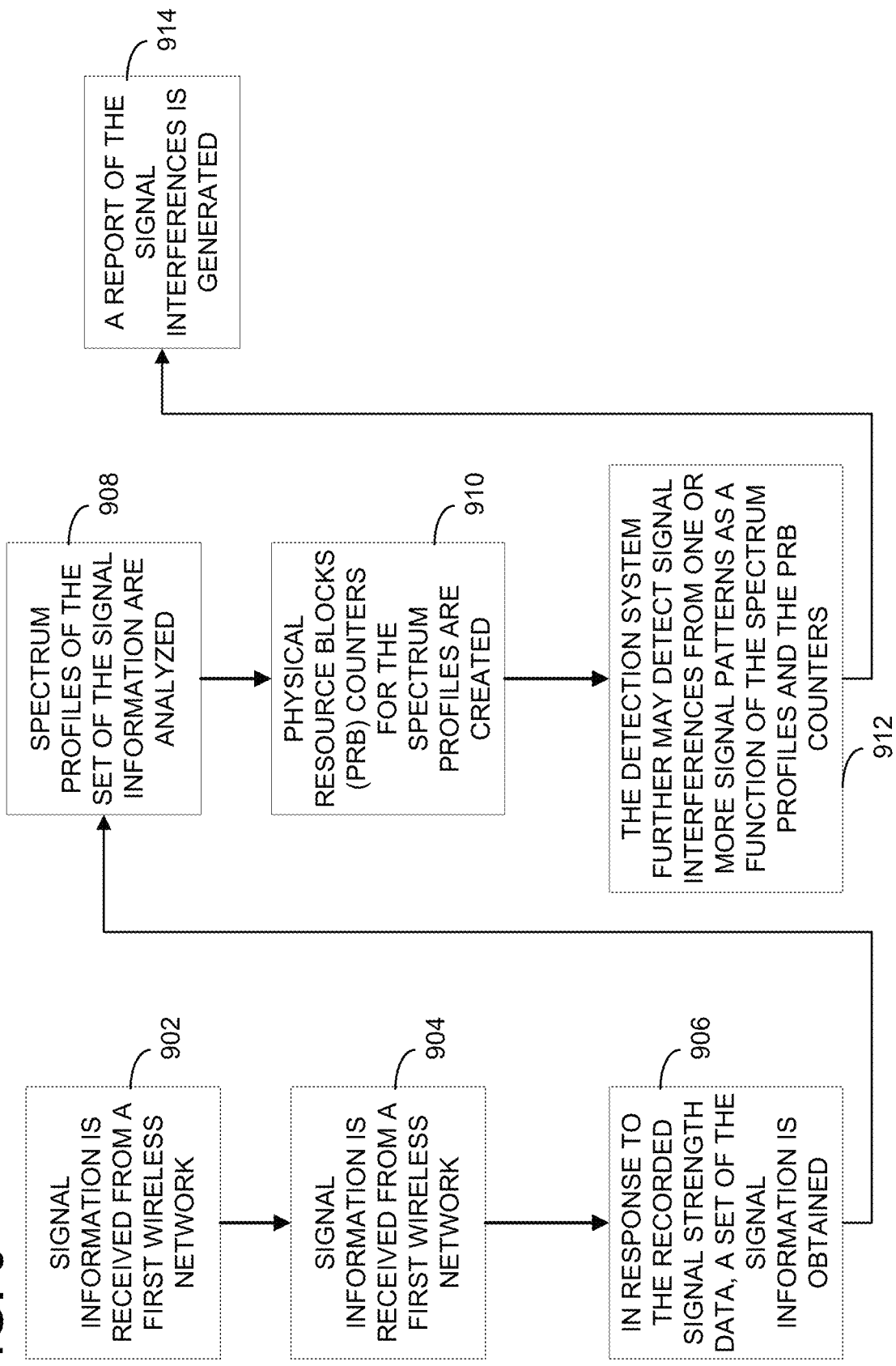
FIG. 9 is a flow chart illustrating a method for detecting signal interferences according to some embodiments.

In some embodiments, FIG. 9 illustrates a flow chart showing a computer-implemented method of detecting signal interferences. In one embodiment, at 902, signal information is received from a first wireless network. As mentioned previously, the signals may be in a variety of frequencies. In some embodiments, some frequencies are discarded. For example, very low frequencies may not be commonly used for wireless communication and may be discarded.

At 904, signal strength data of the signal information is recorded. The strength may be measured in virtually any scale or unit so long as the scale or units are used consistently.

At 906, in response to the recorded signal strength data, a set of the signal information is obtained. For the example, the signal information may include the magnitude of the signal (e.g., 100 or 600).

In another embodiment, at 908, spectrum profiles of the set of the signal information are analyzed. In some examples, the signal information may also be obtained after the artificial intelligence (AI) or machine learning (ML) algorithms are executed so that the signal information may include whether the signal is known. In some other embodiments, the obtained signal information may further include information from the Internet, such as a concert event that is in a close proximity to where the signal is detected.

Moreover, physical resource blocks (PRB) counters for the spectrum profiles are created at 910. In another example, a three dimensional structure may be created to as a counter that take into account not just for the measure of the signals, but also the number of signals as well periodicity or continuity of the signals. For example, A may be the Y axis which may measure the number of days when a particular signal occurs. In another example, B may be in the X axis which may measure the number of hours when the particular signal occurs. In yet another embodiment, C may be in the Z axis which may indicate the number of PRBs.

The detection system further may detect signal interferences from one or more signal patterns as a function of the spectrum profiles and the PRB counters at 912. In some embodiments, a report of the signal interferences is generated at 914. In one embodiment, the report may identify at least one of the following: an indicator whether the signal interferences is permanent, an indicator whether the signal interferences is intermittent, a type of signal interferences, and a severity of at least one of the signal interferences.

By identifying a known signal frequency, the technical problem with existing approach is that there is no indication of whether the signal is an interference. As a result, this leaves the user or the detection algorithm without no or little certainty whether the signal is indeed an interference. Moreover, another technical problem involves an unknown signal, which may be an interference, but because its duration is not measured, based on the spectrum analysis along, it may be ignored based on statistical review.

Therefore, the technical solution to the problem may include the PRB counters layer that perform the additional measurement or input that may add a time dimension to the detected signal. This may enable a more comprehensive understanding of the signal and may enable the user or the analysis software to better flag or indicate the signal and indicate whether the signal is an interference. Furthermore, this additional indication may facilitate the display on a user interface for the user or the API.

Figure 10:
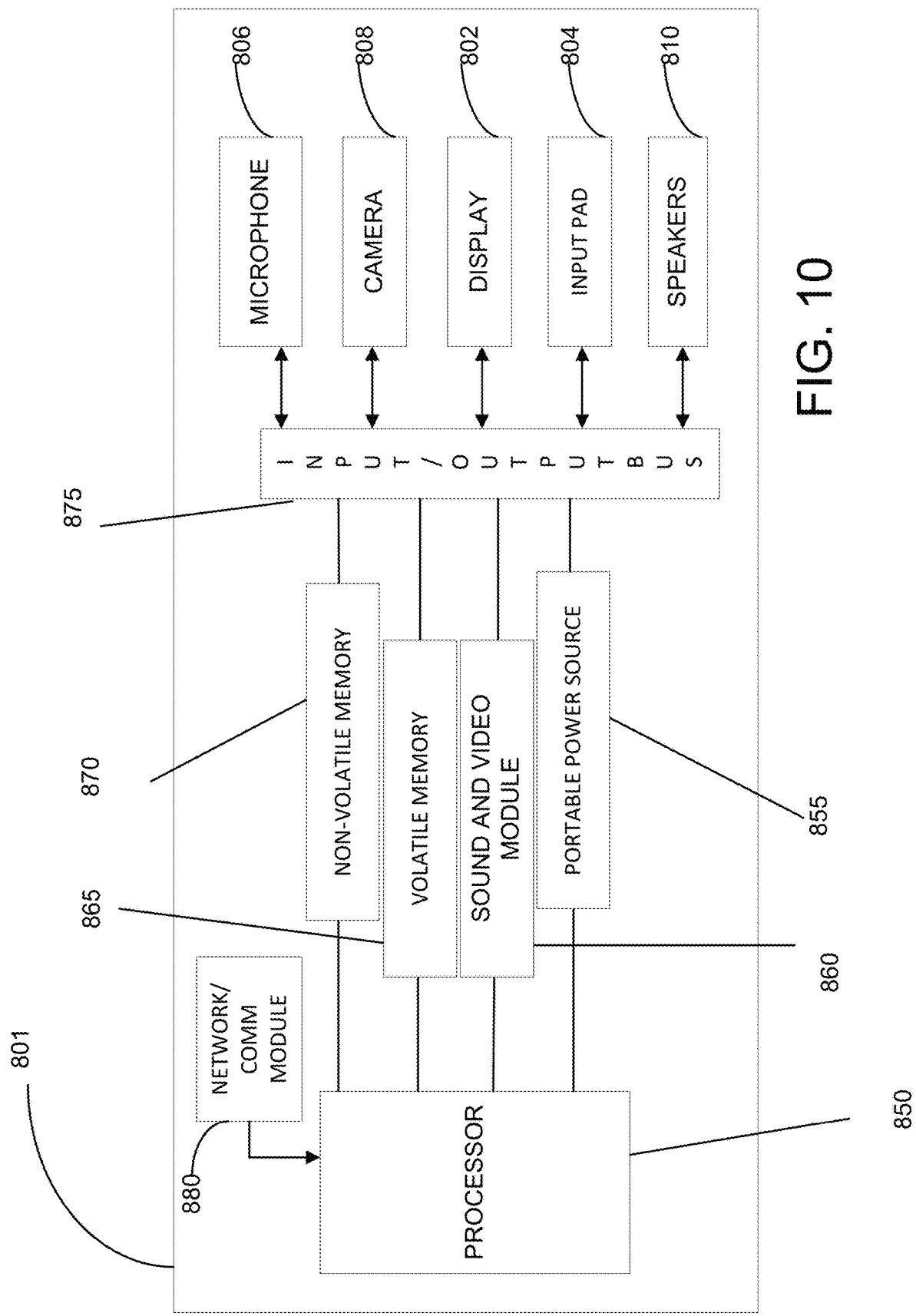
FIG. 10 is a diagram illustrating a portable computing device according to one embodiment.

FIG. 10 may be a high level illustration of a portable computing device 801 communicating with a remote computing device 841 in FIG. 11 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages and different API platforms.

In one embodiment, a portable computing device 801 may be a mobile device 108 that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

The portable computing device 801 may be able to communicate with a computing device 841 or a plurality of computing devices 841 that make up a cloud of computing devices 811. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi® (802.11 standard), BLUETOOTH, cellular communication or near field communication devices. The communication may be direct to the computing device 841 or may be through a communication network such as cellular service, through the Internet, through a private network, through BLUETOOTH, etc., via a network or communication module 880.

FIG. 10 may be a sample portable computing device 801 that is physically configured according to be part of the system. The portable computing device 801 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have non-volatile memory 870 and volatile memory 865. The network or communication module 880 may have GPS, BLUETOOTH, NFC, cellular or other communication capabilities. In one embodiment, some or all of the network or communication capabilities may be separate circuits or may be part of the processor 850. There also may be an input/output bus 875 that shuttles data to and from the various user input devices such as the microphone 806, the camera 808 and other inputs, such as the input pad 804, the display 802, and the speakers 810, etc. It also may control communicating with the networks, either through wireless or wired devices. Of course, this is just one embodiment of the portable computing device 801 and the number and types of portable computing devices 801 is limited only by the imagination.

The physical elements that make up the remote computing device 841 may be further illustrated in FIG. 11. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs such as the input pad 804, the display 802, and the speakers 810, etc. The input/output bus 1020 may also connect to similar devices of the microphone 806, the camera 808, the inputs such as the input pad 804, the display 802, and the speakers 810, or other peripheral devices, etc. The input/output bus 1020 also may interface with a network or communication module 1030 to control communicating with other devices or computer networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The user devices, computers and servers described herein (e.g., 801 or 841) may be computers that may have, among other elements, a microprocessor (such as from the Intel® Corporation, AMD®, ARM®, Qualcomm®, or MediaTek®); volatile and non-volatile memory; one or more mass storage devices (e.g., a hard drive); various user input devices, such as a mouse, a keyboard, or a microphone; and a video display system. The user devices, computers and servers described herein may be running on any one of many operating systems including, but not limited to WINDOWS®, UNIX®, LINUX®, MAC® OS®, iOS®, or Android®. It is contemplated, however, that any suitable operating system may be used for the present invention. The servers may be a cluster of web servers, which may each be LINUX® based and supported by a load balancer that decides which of the cluster of web servers should process a request based upon the current request-load of the available server(s).

The user devices, computers and servers described herein may communicate via networks, including the Internet, wide area network (WAN), local area network (LAN), Wi-Fi®, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of embodiments may become apparent to those skilled in the art upon review of the disclosure. The scope embodiments should, therefore, be determined not with reference to the above description, but instead should be determined with reference to the pending claims along with their full scope or equivalents.

One or more features from any embodiment may be combined with one or more features of any other embodiment without departing from the scope embodiments. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it may be understood by those of ordinary skill in the art having the present specification, figures and claims before them, that the corresponding structure includes a computer, processor, or microprocessor (as the case may be) programmed to perform the particularly recited function using functionality found in a computer after special programming and/or by implementing one or more algorithms to achieve the recited functionality as recited in the claims or steps described above. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one embodiments to the embodiments illustrated.

The present disclosure provides a solution to the long-felt need described above. In particular, the external signal interference radar according to aspects of the invention overcome the shortcomings of the prior art by being able to identify the specific time and signal spectrum that is interfering with the mobile signal. These features enable a better analysis and detection of the legitimate issue of the mobile signal itself.

Further advantages and modifications of the above described system and method may readily occur to those skilled in the art.

The disclosure, in its broader aspects, is therefore not limited to the specific details, representative system and methods, and illustrative examples shown and described above. Various modifications and variations may be made to the above specification without departing from the scope or spirit of the present disclosure, and it is intended that the present disclosure covers all such modifications and variations provided they come within the scope of the following claims and their equivalents.

What is claimed is:

1. A computer-implemented method for detecting intermittent signal interferences comprises:
   receiving signal information from a first wireless network;
   recording signal strength data of the signal information;
   obtaining a set of the signal information;
   analyzing spectrum profiles of the set of the signal information;
   creating physical resource blocks (PRB) counters for the spectrum profiles, wherein the PRB counters comprise a three-dimensional (3D) time sliced matrix, wherein the matrix is defined by a number of days in the y-axis, a number of hours in the x-axis, and a number of PRBs in the z-axis;
   detecting signal interferences from one or more signal patterns as a function of the spectrum profiles and the PRB counters; and
   generating a report of the signal interferences identifying at least one of the following: an indicator whether the signal interferences is permanent, an indicator whether the signal interferences is intermittent, a type of signal interferences, and a severity of at least one of the signal interferences.

2. The computer-implemented method of claim 1, wherein the signal information comprises bandwidth information.

3. The computer-implemented method of claim 2, the bandwidth information comprises 600 MHz bandwidth.

4. The computer-implemented method of claim 1, wherein the report comprises at least three sections: a map section indicating a location aspect of the signal information, a spectrum rendering section illustrating an overview of the spectrum profiles, and a periodicity section indicating a time when one of the signal interferences occurs.

5. The computer-implemented method of claim 1, further comprising receiving additional reference data, wherein the additional reference data comprise location data and timing data.

6. The computer-implemented method of claim 1, further comprising creating a profile for the detected signal interferences.

7. A computer-implemented system for detecting intermittent signal interferences comprises:
   a memory for storing signal information;
   a processor configured to execute computer-executable instructions, wherein the processor is coupled to the memory, wherein the computer-executable instructions comprising:
   receiving signal information from a first wireless network;

recording signal strength data of the signal information;
obtaining a set of the signal information;
analyzing spectrum profiles of the set of the signal information;
creating physical resource blocks (PRB) counters for the spectrum profiles, wherein the PRB counters comprise a three-dimensional (3D) time sliced matrix, wherein the matrix is defined by a number of days in the y-axis, a number of hours in the x-axis, and a number of PRBs in the z-axis;
detecting signal interferences from one or more signal patterns as a function of the spectrum profiles and the PRB counters; and
generating a report of the signal interferences identifying at least one of the following: an indicator whether the signal interferences is permanent, an indicator whether the signal interferences is intermittent, a type of signal interferences, and a severity of at least one of the signal interferences; and
a display, coupled to the processor, for providing the report to a user.

8. The computer-implemented system of claim 7, wherein the signal information comprises bandwidth information.

9. The computer-implemented system of claim 8, the bandwidth information comprises 600 MHz bandwidth.

10. The computer-implemented system of claim 7, wherein the report comprises at least three sections: a map section indicating a location aspect of the signal information, a spectrum rendering section illustrating an overview of the spectrum profiles, and a periodicity section indicating a time when one of the signal interferences occurs.

11. The computer-implemented system of claim 7, wherein detecting the signal interferences comprises detecting based on a digital signal processing (DSP) algorithm.

12. The computer-implemented system of claim 7, wherein the processor is further configured to receive additional reference data, wherein the additional reference data comprise location data and timing data.

13. The computer-implemented system of claim 7, wherein the processor is further configured to create a profile for the detected signal interferences.

14. A non-transitory tangible computer-readable medium having computer-executable instructions stored thereon, wherein the computer-executable instructions are to be executed by a processor for detecting intermittent signal interferences, wherein the computer-executable instructions comprise:

receiving signal information from a first wireless network;
recording signal strength data of the signal information;
obtaining a set of the signal information;
analyzing spectrum profiles of the set of the signal information;
creating physical resource blocks (PRB) counters for the spectrum profiles, wherein the PRB counters comprise a three-dimensional (3D) time sliced matrix, wherein the matrix is defined by a number of days in the y-axis, a number of hours in the x-axis, and a number of PRBs in the z-axis;
detecting signal interferences from one or more signal patterns as a function of the spectrum profiles and the PRB counters; and
generating a user interface (UI) identifying the signal interferences having at least one of the following: an indicator whether the signal interferences is permanent, an indicator whether the signal interferences is intermittent, a type of signal interferences, and a severity of at least one of the signal interferences.

15. The non-transitory tangible computer-readable medium of claim 14, wherein the signal information comprises bandwidth information.

16. The non-transitory tangible computer-readable medium of claim 15, the bandwidth information comprises 600 MHz bandwidth.

17. The non-transitory tangible computer-readable medium of claim 14, wherein the UI comprises at least three sections: a map section indicating a location aspect of the signal information, a spectrum rendering section illustrating an overview of the spectrum profiles, and a periodicity section indicating a time when one of the signal interferences occurs.

18. The non-transitory tangible computer-readable medium of claim 14, wherein detecting the signal interferences comprises detecting based on a digital signal processing (DSP) algorithm.

19. The non-transitory tangible computer-readable medium of claim 14, further comprising receiving additional reference data, wherein the additional reference data comprise location data and timing data.

20. The non-transitory tangible computer-readable medium of claim 14, further comprising creating a profile for the detected signal interferences.

* * * * *